Aug. 1, 1950     G. N. BRUNKER     2,516,953
WEATHER STRIP
Filed Jan. 31, 1944     2 Sheets-Sheet 1
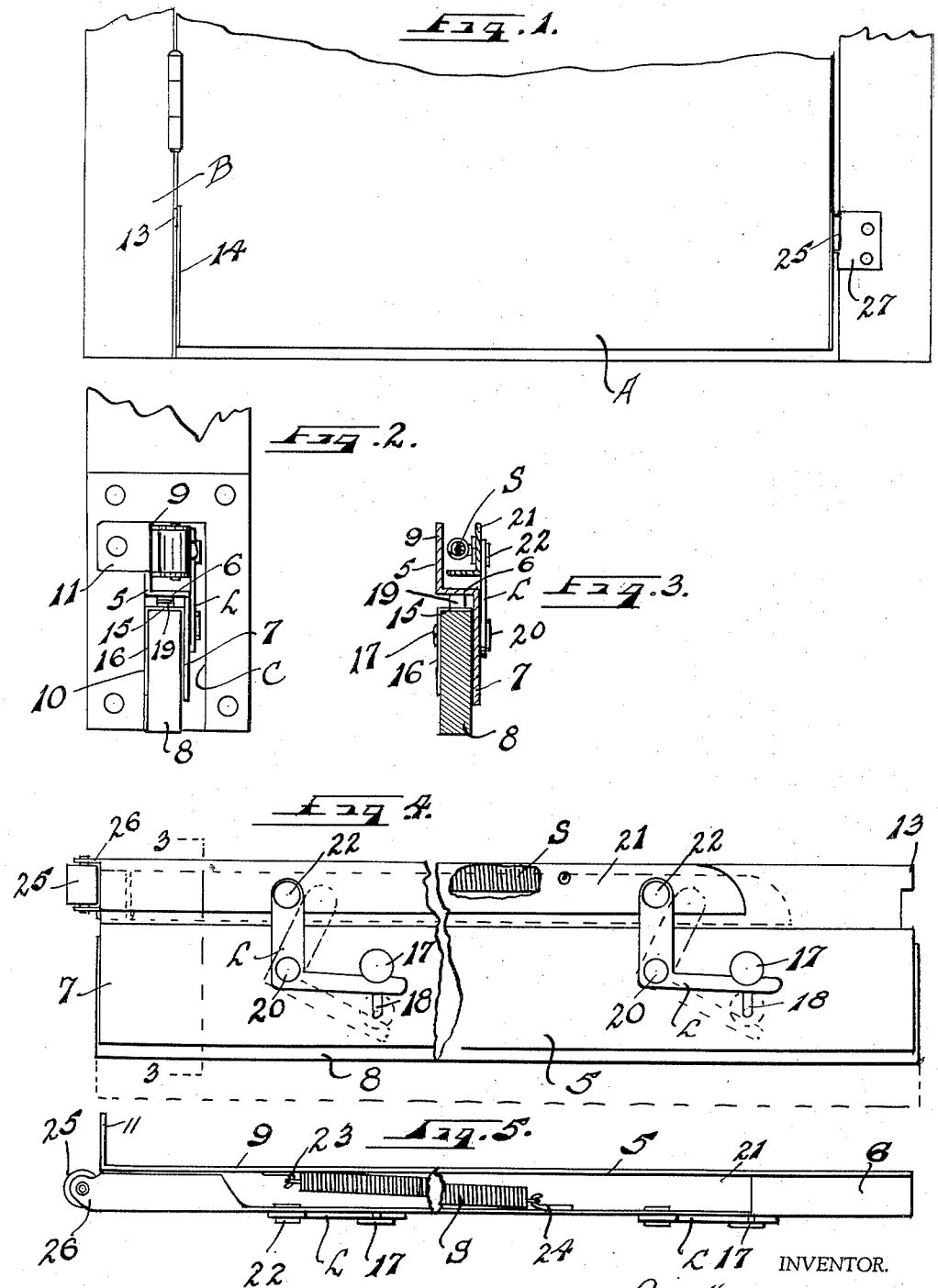
INVENTOR.
Geo. N. Brunker
BY R. M. Thomas
Attorney Aug. 1, 1950            G. N. BRUNKER            2,516,953
WEATHER STRIP
Filed Jan. 31, 1944            2 Sheets-Sheet 2
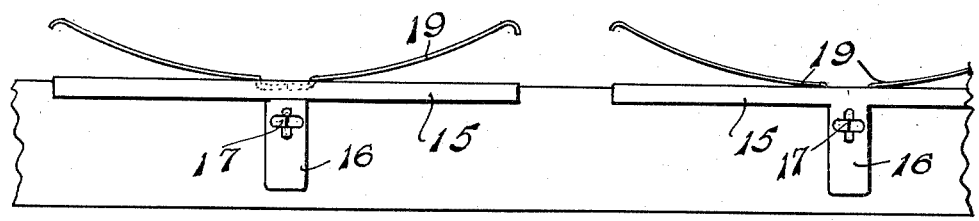
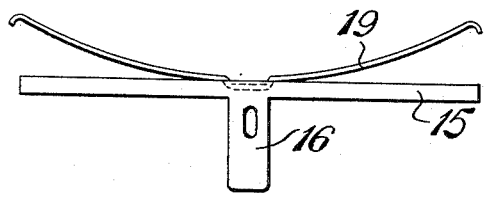
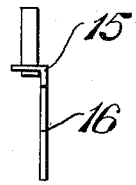
INVENTOR.
George N. Brunker Patented Aug. 1, 1950

2,516,953

UNITED STATES PATENT OFFICE 2,516,953

WEATHER STRIP

George N. Brunker, Salt Lake City, Utah

Application January 31, 1944, Serial No. 520,417

1 Claim. (Cl. 20—68)

My invention relates to weather stripping for doors and like closures and has for its object to provide a weather stripping which will be completely concealed yet which will be brought into contact with the door sill at the instant of closing of the door and which will instantly raise upon the slightest opening of the door.

A further object is to provide a weather strip which will be set in a vertical slot cut along the bottom of the closure or door which strip may be used in the finest of doors without having an unsightly appearance, yet a closure seal which will close the maximum amount of space under the door.

A still further object is to provide a weather stripping which will be easily and quickly installed and which may also be quickly and easily removed for cleaning, yet which is positive in its sealing action.

A still further object is to provide a weather strip which when it is engaged with the floor to seal under the door is so constructed that the lifting elements are entirely disengaged from the sealing medium and there is no spring tendency to lift the sealing strip but instead all of the spring pressure behind the sealing strip is engaged in pressing the strip down to engage the floor.

A still further object is to provide a new spring medium for holding a strip of weather sealing material into engagement with the door sill, frame, or when used on windows around the perimeter of the window or door frame.

These and other objects I accomplish with the device illustrated in the accompanying drawings in which similar numerals and letters of reference indicate like parts throughout the several views and as described in the specification forming a part of this application and pointed out in the appended claim.

In the drawings:

Figure 1 is a face view of the door with the strip used to close the bottom opening thereunder showing the door closed.

Figure 2 is an end view of the lower free edge portion of the door.

Figure 3 is a section on line 3—3 of Figure 4.

Figure 4 is a view of the stripping removed from the door.

Figure 5 is a plan view of Figure 4.

Figure 6 is a face view of a portion of the felt strip showing the spring means for holding it down in place.

Figure 7 is a face view of the spring clip for holding the felt stripping in tensioned relationship with the floor or with the frame.

Figure 8 is an end view of Figure 7.

In the drawings I have shown the door as A, and the door frame as B. Across the bottom of the door medially thereof I provide a slot C extending up therein and from edge to edge of the door, the depth of the slot being sufficient to encompass the sealing strip.

The carrier plate 5 for the sealing strip consists of an elongated strip of angularly formed metal or plastic having a horizontal portion 6 formed therein with one vertical portion 7 extending down to overlap the felt weather sealing strip 8 and with the vertical portion 9 extending up substantially to the bottom of the slot C and adapted to rest against one side 10 of the slot C. The vertical portion 9 is provided with one hinged end bent at right angles to form a securing flange or lug 11 which is secured to the hinged end of the door by a screw or other suitable means. The other end of the vertical portion 9 is provided with a lip 13 adapted to fit into a recess in a flat plate 14 which is secured to the hinged edge of the door to support the entire device therein. These two ends provide the means for suspending the entire device in the slot C. When secured to the door in this manner the portions 6 and 7 of the plate 5 together with one side of the slot C form a channel in which the sealing strip 8 is carried and operated. The top edge of the sealing strip is provided with spaced apart metal angle braces or plates 15 with each brace provided with a downwardly turned flange 16 through which a split rivet or solid rivet 17 is passed. The face of the plate 5 is provided with vertical slots 18 in which the rivets are operable and through which these rivets are extended with their large head outwardly of the plate. Attached to the braces 15 I provide elliptical springs 19 having their free ends engaging the horizontal portion of the plate 5 and these springs normally react against the top of the sealing strip 8 to hold it pressed against the door sill or floor under spring pressure. The bell crank levers L are pivotally attached to the plate 5 by pivots 20 at the bend of the lever and the top end of each lever is pivotally attached by rivets or pivot pins 22 to an angularly formed actuating rod 21 which is carried above the horizontal portion 6 of the plate 5. The actuating rod 21 is carried spaced above the horizontal portion 6 by the bell crank levers and longitudinal movement of the actuating rod causes the bell crank levers L to be operated thus releasing the springs 19 to force the sealing strip down toward the floor or sill of the door and if the member is moved its full amount of movement the strip engages the floor or sill forming the sealing means under the door. The actuating rod is held so that the bell crank levers are all lifted under the rivets by a coil spring S having one end attached to the vertical portion 9 by a hook 23 and the other end attached to the actuating rod 21 by a hook 24. The tension of the spring is set so that it normally holds the levers L lifted and therefore the sealing strip elevated from the floor. The means for causing the release of the springs 19 is provided by mounting a roller 25 in the bifurcated end 26 of the actuating rod 21 and this roller is mounted on a vertical shaft and is adapted to strike an operating plate 27 secured to the door frame by screws as shown in Figure 1 of the drawings. This plate 27 is preferably mounted on the door frame opposite to the side on which the door hinges are mounted for supporting the door and the plate is preferably formed with a slanting or ramp face so that the roller rolls over the face thereof moving the angle member longitudinally as it moves over the face of the ramp. This provides the quick action of the device for the instant that the door is opened sufficient distance for the roller to leave the ramp face the springs elevate the weather sealing strip and it remains so elevated until the door is closed again at which time it is then lowered to sealing position just as the door is closing when the roller strikes the ramp.

Having thus described my invention I desire to secure by Letters Patent and claim:

A weather strip comprising a carrier plate of angular section having a horizontal portion and vertical portions extending respectively upwardly and downwardly from the longitudinal edges of said horizontal portion, a sealing strip disposed underneath said horizontal portion and having means thereon in vertical sliding engagement with said downwardly extending portion, an actuating rod of angular section having a vertical portion above and substantially in the plane of the downwardly extending portion of the carrier plate and an inwardly, horizontally disposed portion parallel to and above the horizontal portion of the carrier plate for actuating said sealing strip, bell crank levers pivoted at their angles to the downwardly extending portion of said carrier plate, upwardly extending arms of said levers being pivoted to said rod, longitudinally extending arms of said levers engaging said means on the sealing strip, said rod extending outwardly of the end of said carrier plate away from which said longitudinally extending arms extend and a spring mounted within the upwardly extending portion of said carrier plate and the horizontal and vertical portions of said rod, opposite ends of said spring being secured respectively to said rod and said carrier plate, said spring urging the outwardly extending end of the rod outwardly to thereby elevate the sealing strip.

GEORGE M. BRUNKER.

REFERENCES CITED

The following references are of record in the file of this patent:

UNITED STATES PATENTS

| Number | Name | Date |
|---|---|---|
| 625,713 | Taylor | May 23, 1899 |
| 640,472 | Knight | Jan. 2, 1900 |
| 938,107 | Beale | Oct. 26, 1909 |
| 1,613,496 | Wonsowicz | Jan. 4, 1927 |
| 1,973,210 | Hufnail et al. | Sept. 11, 1934 |
| 2,298,878 | Egli | Oct. 13, 1942 |

FOREIGN PATENTS

| Number | Country | Date |
|---|---|---|
| 493,423 | Great Britain | Oct. 7, 1938 |
| 739,760 | France | 1932 |